July 11, 1933.  E. WOHLENHAUS  1,918,163
LIQUID CLUTCH
Filed April 1, 1930

INVENTOR.
EMIL WOHLENHAUS,
BY
ATTORNEY.

Patented July 11, 1933

1,918,163

UNITED STATES PATENT OFFICE

EMIL WOHLENHAUS, OF WELCOME, MINNESOTA

LIQUID CLUTCH

Application filed April 1, 1930. Serial No. 440,817.

This invention relates to clutches, and more particularly to a frictionless liquid clutch adapted to transmit power from a driving to a driven element, at variable speeds proportional to the torque resistance of the driven elements, so that the usual change speed gearing commonly employed in automobiles and many other mechanisms, in conjunction with clutches, may be eliminated, with resultant economy and simplification.

In the accompanying drawing.

Like numerals designate corresponding parts in all of the figures of the drawing.

Figure 1:
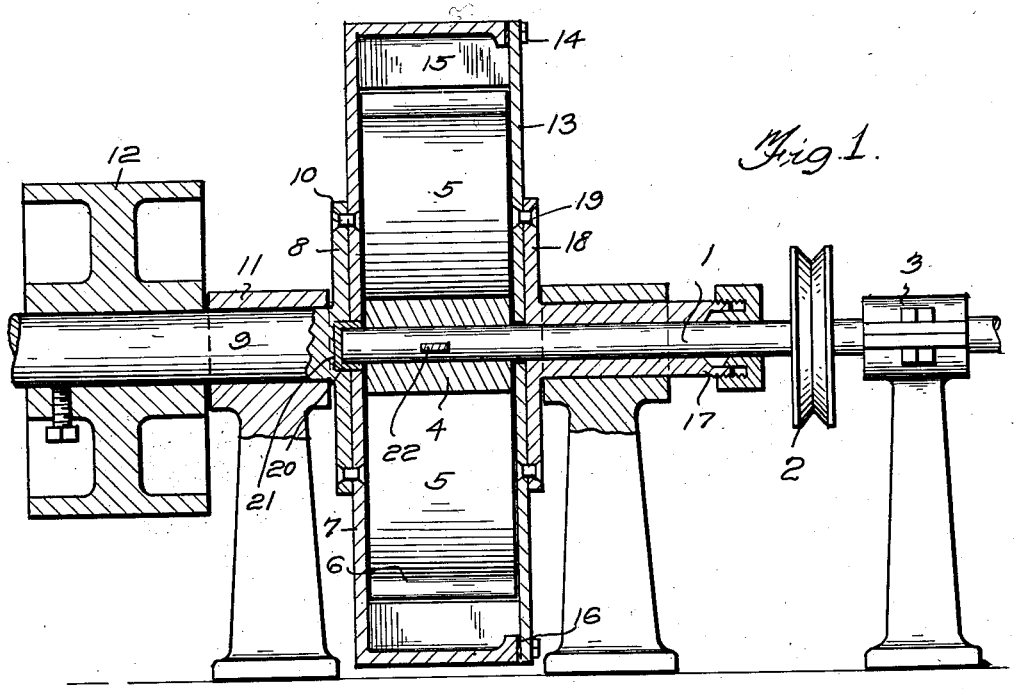
Fig. 1 is a center longitudinal sectional view.
Figure 2:
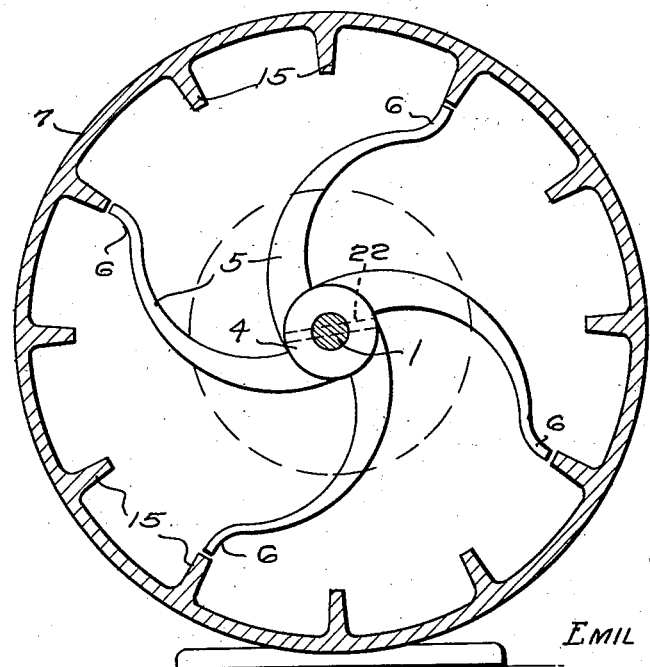
Fig. 2 is a transverse sectional view through the drum hereinafter described.

Referring to the drawing, 1 designates a driving shaft to which power may be applied through any suitable means, such as a pulley, gear, universal joint, or otherwise. For purposes of explanation, I have illustrated a pulley 2 upon the shaft 1. The outer end of the shaft is supported in any suitable form of bearing 3. At its inner end the shaft carries a propeller consisting of a hub 4, and, preferably, curved blades or impellers 5. The shape of these blades may vary from that shown and still secure desired results. However, I have found the shape shown to be effective, in practice. It will be noted that the terminal ends of the blades are bent in such manner as to form cup-like elements 6, which serve a purpose hereinafter set forth. The impeller is disposed in a drum 7. A flange 8, of a driven shaft 9, is secured by riveting, welding, or otherwise, as indicated at 10, to the drum 7, so that this drum and shaft are caused to turn together. The shaft 9 is supported in any suitable form of bearing, indicated at 11, and it may carry a pulley 12, or any other suitable power transmitting element. The drum is provided with an open side which is normally closed by a plate 13, said plate constituting a side of the drum. This plate is held in place by cap screws or stud bolts 14, said screws entering suitable threaded recesses formed in inwardly projecting radial lugs 15. The drum is rendered fluid tight by the provision of a gasket 16, and a stuffing box 17. This stuffing box is carried by a flange 18, which corresponds to the flange 8, and which is riveted, or otherwise secured, to the plate 13, as indicated at 19. The stuffing box serves to provide a fluid-tight packing about the shaft 1, while permitting rotation of said shaft. A bronze box or cap 20 is seated in a recess 21, of the drum and its flange 8, and receives the inner end of the shaft 1. The hub of the impeller may be secured to the shaft 1 in any desired manner, as, for example, by a pin 22. The hub is slightly longer than the width of the blades 5, so that with the hub making a snug endwise fit between the two sides of the drum, the edges of the blades are held out of dragging contact with the side walls of the drum. Any suitable fluid is placed in the drum, to the effective level for the purposes sought. I find oil to be suitable for the purposes, though other liquids may be employed, if desired. Rotation being imparted to shaft 1, counter-clockwise in Fig. 2, the blades 5 act to throw the liquid centrifugally outward in such manner that the body of liquid forms an interlock or connection between the blades and the lugs 15, in such manner that the drum 7 and shaft 9 are caused to rotate with shaft 1. When in action, there is a void at the center of the body of liquid, due to the fact that the liquid has moved outwardly into the spaces between the lugs.

It is apparent that whenever the load on shaft 9 exceeds the effective bite or engagement between blades 5 and lugs 15, there will be such slippage or relative movement between the impeller and the drum as will, in effect, bring about a slower rotation of shaft 9 than that of shaft 1. Thus, in starting a load, such as an automobile, from a standstill, when the resistance torque is great, the driven shaft may be driven by shaft 1 materially slower than shaft 1, while, as the resistance torque decreases, as the vehicle gains momentum, shaft 9 will begin to approach the rate of speed of shaft 1, and the speed with which shaft 9 approaches the degree of rotation of shaft 1 will be directly proportional to the resistance torque. Thus, the usual change speed gearing employed in automobiles may be dispensed with, and the very simple and inexpensive means herein shown may be utilized to take the place of expensive gear sets, and, at the same time, avoid the necessity of the annoying gear shifting operations.

In practice, I find the blades illustrated in the drawing, to be highly effective. The inner portions of the blades set the whole body of liquid in motion, rapidly, while the cups 6 enable the blades to get such a hold on the liquid as to effectively thrust or push it against the lugs, and this gives a very effective bite or engagement between the blades and the lugs.

While I have found the construction shown to be highly efficient in operation, it is to be understood that the invention is not limited to the precise arrangement described, but that the invention includes within its purview whatever changes fairly come within either the terms or the spirit of the appended claims.

Having described my invention, what I claim is:

1. A transmission apparatus of the character described comprising a driving shaft, a driven shaft, an impeller carried by the driving shaft comprising a plurality of radial blades of curved formation with their convex sides disposed forwardly and with their terminal ends curved to cup formation, a drum carried by the driven shaft in which said impeller is disposed, and a plurality of radial blades disposed about the inner periphery of the drum and adapted to be engaged by liquid thrown outwardly by the impeller, the spacing of the blades of the impeller and the blades of the drum being such, with relation to each other, that the blades of the drum are simultaneously aligned with the blades of the impeller, and a plurality of the blades of the drum lie between a pair of blades of the impeller.

2. A transmission apparatus of the character described, comprising a driving shaft and a driven shaft, a drum carried by the driven shaft, a plurality of inwardly directed blades disposed about the inner periphery of the drum and a plurality of blades constituting an impeller, carried by the driving shaft, said blades being curved throughout the major portion of their length in one direction and with their convex sides disposed forwardly and being curved in reverse direction at their ends to constitute cup-like portions, said drum receiving a body of liquid which, when thrown outwardly under the action of the impeller, is engaged between the cup-like portions and the inwardly directed blades of the drum to lock the two together as described.

In testimony whereof I affix my signature.

EMIL WOHLENHAUS.